United States Patent [19]
Hardison et al.

[11] 3,782,400
[45] Jan. 1, 1974

[54] VALVING SYSTEM FOR SUPPLYING FUEL TO TANKS AND TRANSFERRING FUEL BETWEEN TANKS

[75] Inventors: Artson P. Hardison; E. Ellsworth Hieber, both of Glendale, Calif.

[73] Assignee: Xar Industries Incorporated, City of Industry, Calif.

[22] Filed: Mar. 17, 1972

[21] Appl. No.: 235,613

[52] U.S. Cl.................... 137/39, 137/209, 137/389, 137/390, 137/413
[51] Int. Cl............................................. F16k 31/34
[58] Field of Search..................... 137/39, 209, 389, 137/390, 413, 493

[56] References Cited
UNITED STATES PATENTS

| | | | |
|---|---|---|---|
| 2,749,936 | 6/1956 | Mosher | 137/389 X |
| 2,851,055 | 9/1958 | Mosher | 137/413 X |
| 3,057,588 | 10/1962 | Kolbe | 137/209 X |
| 3,402,732 | 9/1968 | Hardison | 137/390 |
| 3,237,639 | 3/1966 | Mosher | 137/390 |

*Primary Examiner*—Robert G. Nilson
*Attorney*—D. Gordon Angus et al.

[57] ABSTRACT

A flow control system to admit fuel to an aircraft fuel tank and to provide for fuel transfer between that tank and another tank. The system includes a pilot valve which is sensitive to fuel level at an upper elevation of the tank, and a flow valve disposed at a lower elevation of the tank. A fuel conduit connects the flow valve to a source of supply and to other tanks to which fuel is to be transferred, and a pilot line interconnects the pilot valve and the flow valve. The flow valve is a differential pressure type valve, and a flow signal for selecting its flow condition is supplied by the pilot valve. Means is provided to change the condition of the pilot valve for shutoff and for checkout purposes. The flow valve may also include shutoff means responsive to an empty tank and to negative g-forces.

10 Claims, 10 Drawing Figures

PATENTED JAN 1 1974 3,782,400

VALVING SYSTEM FOR SUPPLYING FUEL TO TANKS AND TRANSFERRING FUEL BETWEEN TANKS

This invention relates to a valving system for fueling an aircraft tank and for transferring the fuel from it to another tank.

Fueling systems for aircraft tanks, particularly for their external tanks, are generally known. Their function is to accept fuel, either from ground supplies or from aerial tankers so as to receive the fuel in a partially empty, or empty, tank until the tank is filled. Such valving systems must be provided with means for functional checkout and for interruption of function in mid-air refueling situations. Further, it is necessary to provide for controlling the transfer of the fuel from one tank to another. Another desirable objective of such a valving system is to prevent transfer of fuel under negative g or inverted flight circumstances so that gases will not be transferred instead of liquid fuel.

It is an object of this invention to provide a valving system capable of assuming a number of control conditions to accomplish the foregoing while still utilizing a simply constructed, rugged and inherently reliable pilot valve and flow valve.

A flow control system according to this invention includes a pilot valve disposed at an upper elevation in a tank, and a flow valve in the tank at a lower elevation. The pilot valve is sensitive to the level of the fuel in the tank near its own elevation, and its setting provides a pilot signal to the flow valve for controlling its open or closed position.

The flow valve is a differential pressure-operated valve which has a piston whose open or closed position relative to a seat is determined by the pressure differential across it, which in turn is a function of the condition and setting of the pilot valve.

According to a preferred but optional feature of the invention, the pilot valve may be provided with means for stopping the fuel transfer in mid-operation or for ground checkout.

The above and other features of this invention will be fully understood from the following detailed description and the accompanying drawings in which.

Figure 1:
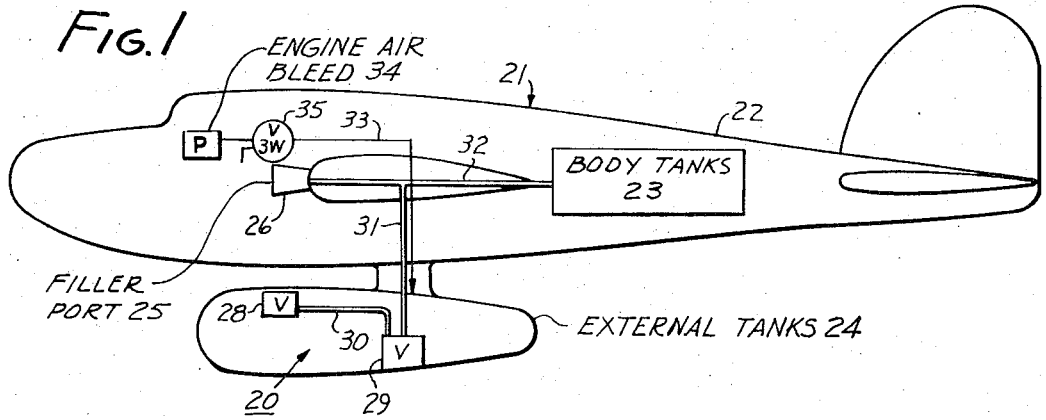
FIG. 1 is a side schematic elevation of an aircraft showing the disposition of certain elements of this invention.

A valving system 20 according to this invention is shown in FIG. 1 installed in an aircraft 21, which aircraft has a fuselage 22 carrying main fuel body tanks 23. The aircraft also carries external tanks 24, which may be suspended from the aircraft itself or from the wings, as preferred. The system includes a filler port 25. The filler port 25 is adjacent to an adapter 26 which may receive the nozzle from an aerial tanker, or the nozzle from a land-based fuel supply.

An external tank 24 is carried by the fuselage and is adapted to receive fuel. A pilot valve 28 according to the invention is disposed in the tank at an upper elevation, and a flow valve 29 is disposed in the tank at a lower elevation. A pilot conduit 30 interconnects these two valves. A fuel conduit 31 interconnects flow valve 29 with port 25, and by a branch 32 also interconnects the external tank to a body tank 23. A pressure line 33 extends from a source of pressure 34, such as a jet engine compressor air bleed, through a three-way valve 35 to tank 24, for the purpose of maintaining its fuel under pressure when the value is in an open, pressure-transmitting condition to subject the external tank to pressure.

The function of the valving system is to enable fuel to be supplied to tank 24 until the tank is full, and to enable its contents to be transferred to another tank; for example, body tank 23 when desired. The system also provides for operation functional checkout and for off-on control during refueling. In addition, it can also provide means to stop the transfer function under conditions of negative g-forces, or when the external tank is empty.

Figure 2:
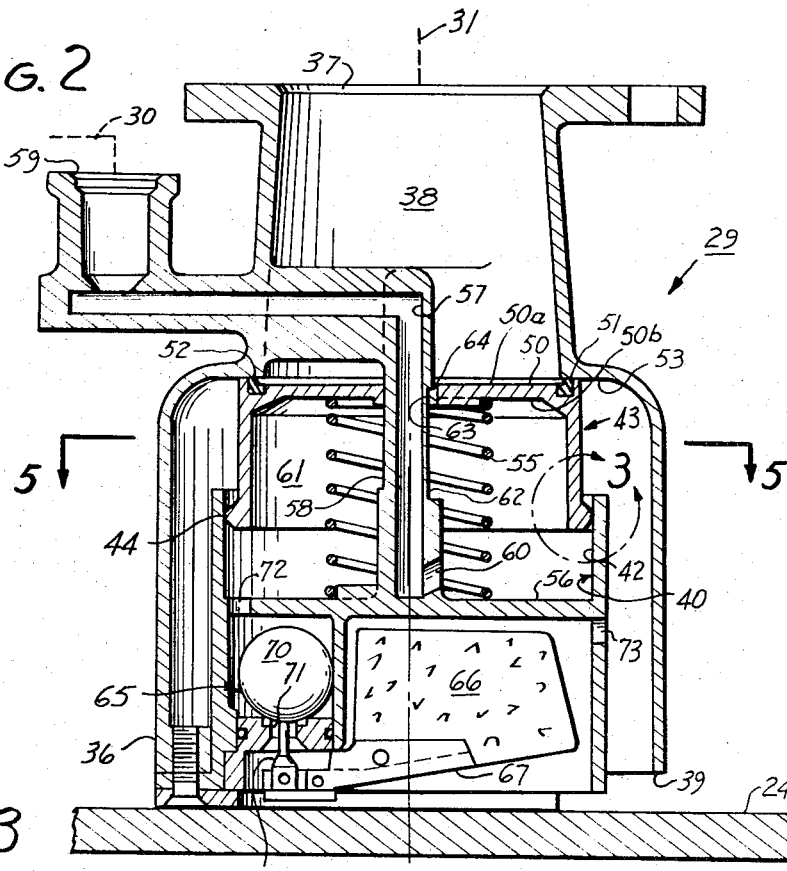
FIG. 2 is an axial cross-section of a flow valve according to the invention.
Figure 3:
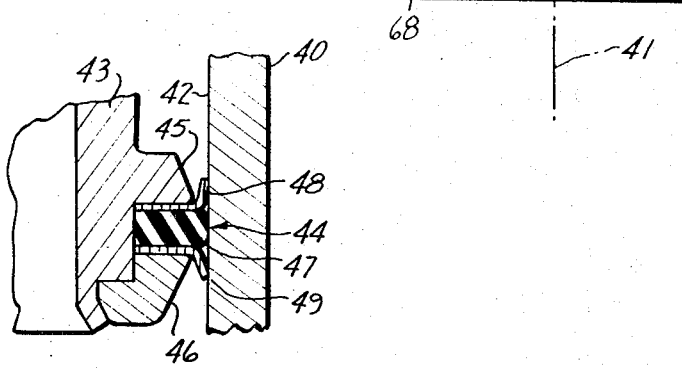
FIG. 3 is a fragmentary cross-section view taken at region 3 in FIG. 2.

Flow valve 29 is shown in detail in FIG. 2. It includes a body 36 with a port 37, to which port the fuel conduit 31 is connected. The body includes a central passage 38 (sometimes called a first passage) which is relatively narrow at its upper end and which is relatively wide at its lower end, where it terminates at a skirt 39 near the lower end of the flow valve. Within the larger portion of the central passage there is disposed a cylinder 40 which extends along an axis 41 and has an axially extending cylindrical wall 42 (sometimes called an "inner bore"). The enlarged portion of the flow passage shrouds the cylinder. A piston 43 in the cylinder carries a peripheral sliding seal 44. This seal slides along the wall of bore 42 making a full peripheral sliding, fluid-sealing fit between the piston and the wall 42. This seal is more fully illustrated in FIG. 3 wherein a pair of shoulders 45, 46 sandwich between them a retainer 47 and a pair of oppositely directed flange seals 48, 49, thereby making a bi-directional flange-type seal.

The bore has a diameter which defines the cross-sectional area of the piston at seal 44. At the projecting end 50 of the piston there is carried a circular seal 51 whose diameter is less than that of the bore, whereby this piston becomes a differential area piston with a larger area facing inside the bore than faces outwardly within the seal. The piston has two faces, 50a and 50b, which are on opposite "sides" of the boundary formed by the seal 44.

Seal 51 preferably has a lip 52 which is resiliently deflectible for making a seal against a valve seat 53 (sometimes called a "shoulder") on the body so as to interrupt flow through central passage 38 when the piston is located as shown in FIG. 2. Axis 41 extends toward valve seat 53. A bias spring 55 forces the piston toward valve seat 53 and is backed up by a base 56.

Pilot conduit 30 passes through a post 58 and out through a connector 59 to the pilot valve. The pilot conduit is side-tapped by a passage 60 which enters chamber 61. Chamber 61 is formed inside the cylinder, between the piston and the base. The post has an external slot 62 which does not pass entirely through the post, but does provide a clearance between the wall of the post and the opening 63 in the piston. There is a smaller clearance 64 between the post and the piston, even when in the position shown in FIG. 2, which forms a restricted bleed passage interconnecting faces 50a and 50b. The clearance is, of course, larger when the piston has moved downwardly from the position of FIG. 2 and the slot registers with opening 63 for the full length of the opening. The post extends across faces 50a and 50b.

Figure 4:
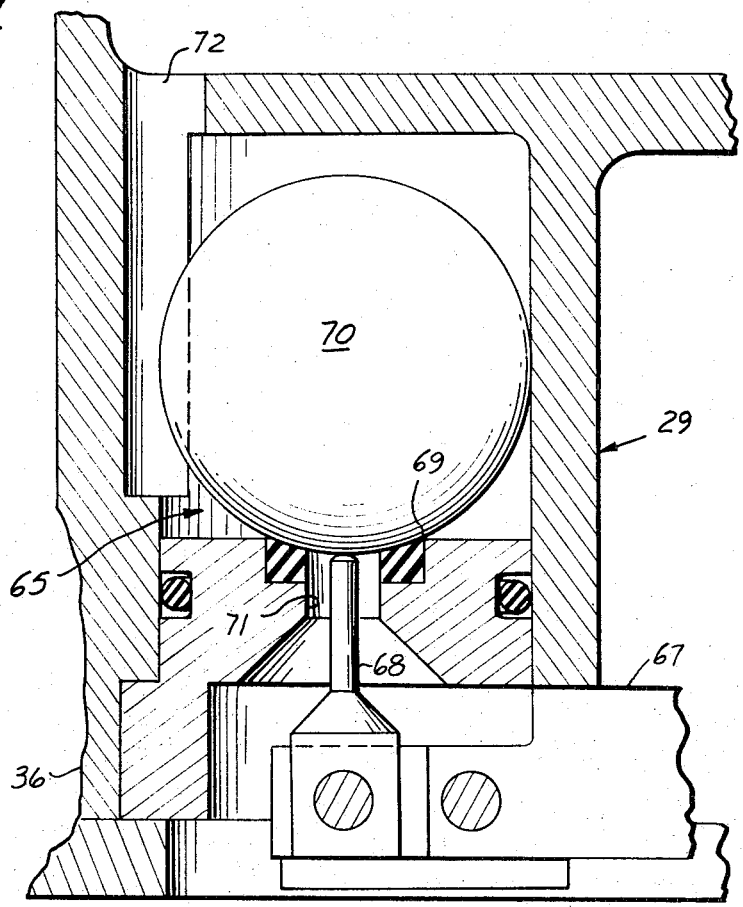
FIG. 4 is an axial cross-section of a portion of FIG. 2.
Figure 5:
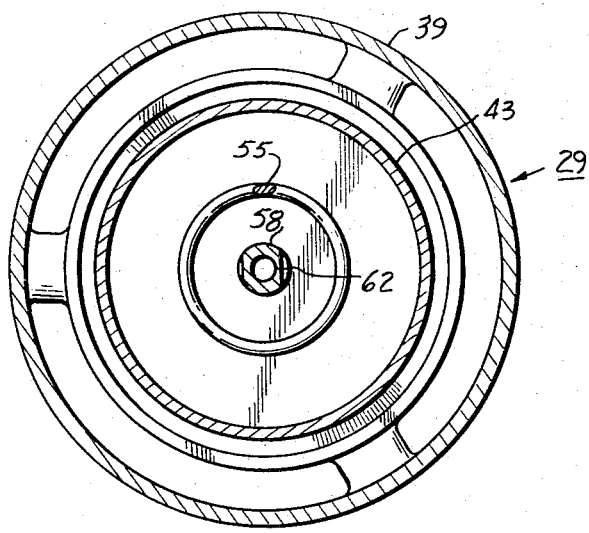
FIG. 5 is a cross-section taken at line 5—5 of FIG. 2.

For the purpose of sensing when there is a negative g-condition or an absence of fuel in tank 24, an auxiliary cutoff valve 65 is formed in the bottom of the fuel valve. This comprises a buoyant float 66, which is pivotally mounted to the flow valve by pivot 67, and is located at a level indicative of the lowest desired fuel level in the tank. A pin 68 (see FIG. 4) is attached to pivot 67. The pin projects upwardly through a circular value seat 69 and is aligned with a ball seal 70. When the float is buoyantly raised to the position shown, pin 68 is drawn downwardly so that it does not interfere with the seating of ball seal 70 on seat 69, and port 71 is closed. Port 71 is in fluid communication with chamber 61 through opening 72 when the ball seal is lifted off the seat 69. Port 71 and opening 72 comprise a passage connecting cylinder 40 to the fuel tank, the valve means formed by valve seal 69 and ball seat 70 being disposed in this passage.

The lifting of the ball seal will occur when the aircraft is inverted or under negative g-conditions, and will also occur when the fuel tank is empty. In the former case, the ball seal will fall or drift away from the seat. In the latter case, the float will drop, and the pin will rise to lift the ball off the seat. Port 71 is exposed to conditions inside the tank through opening in the cylinder at its base and also through opening 73 (see FIG. 2) in the wall of the cylinder.

Figure 6:
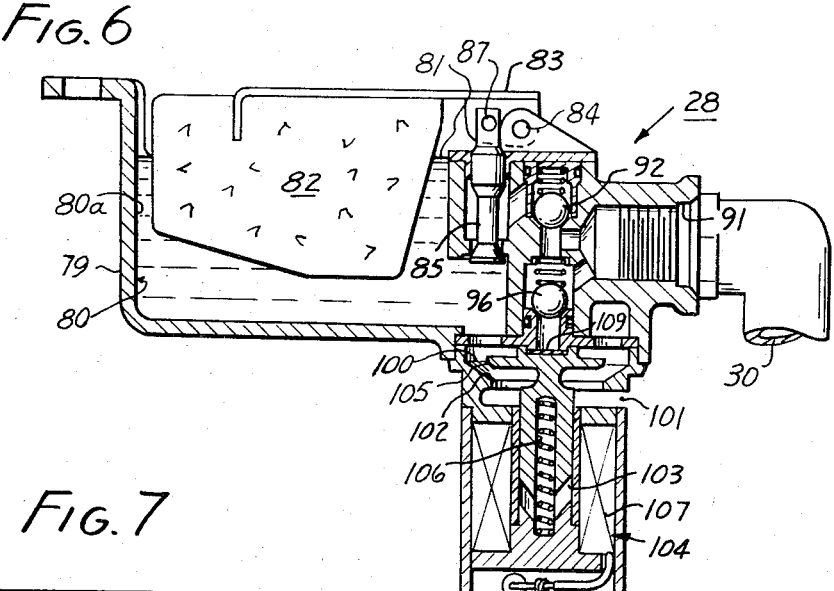
FIG. 6 is an axial cross-section of a pilot valve according to the invention.
Figure 7:
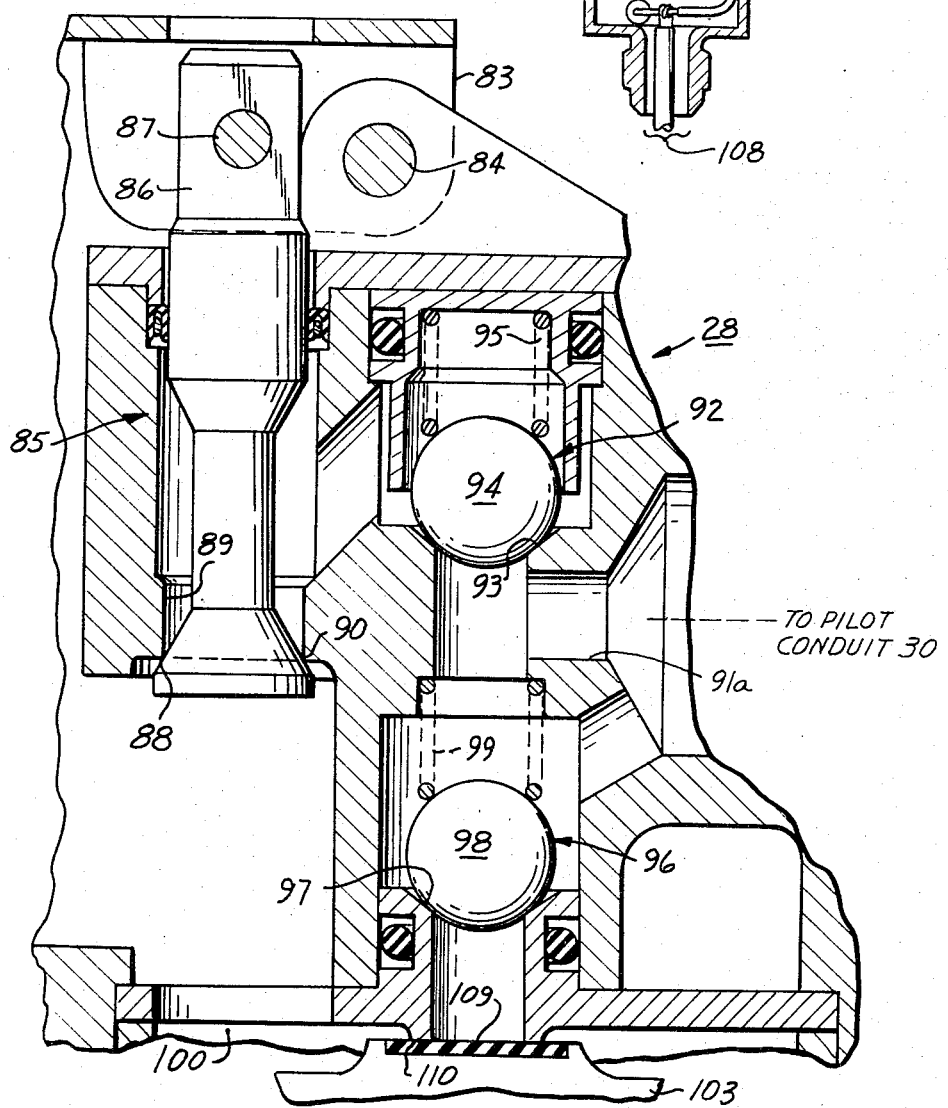
FIG. 7 is an enlarged fragmentary view of a portion of FIG. 6.

In FIG. 6 the pilot valve 28 is more fully shown. It is disposed at an upper region in the tank relative to the flow valve. The pilot valve includes a body 79 that has an open-topped cup 80 with a peripheral wall 80a surrounding it. The cup can hold liquid at least to the level shown at 81. Under such circumstances, buoyant float 82 will be buoyantly supported in the cup at the position shown in FIG. 6. Float 82 is supported by pivot arm 83 and pin 84. A poppet valve 85 includes a poppet pin 86 that is rotatably pinned to pivot arm 83 by pin 87. This valve also includes a seat 88 (FIG. 7) with a port 89 inside it, and the pin includes a tapered seal 90 which is adapted to bear against seat 88 so as to close the same in the condition shown in FIG. 7. The poppet valve is closed when the cup is full and open when it is not, while under control of the float.

The pilot valve includes a connector 91, to which pilot conduit 30 is connected, so that connectors 59 and 91 and their respective valves are interconnected. Thus, the pilot valve is sensitive to the pressure in chamber 61 of the flow valve and vice versa. Pilot inlet 91a is connected to connector 91 and thereby to the pilot conduit.

A first check valve 92 is serially connected between the pilot inlet and the inside of poppet valve 85. It includes a seat 93 and a ball seal 94. Positive differential pressure in the direction toward the poppet valve will open the first check valve. The ball seal is pressed toward its seat by a bias spring 95 so as to require a positive differential pressure to open. A second check valve 96 is connected to the pilot conduit and includes a seat 97, a ball seal 98 and a bias spring 99. Positive differential pressure from the pilot inlet will tend to close the second check valve.

Figure 9:
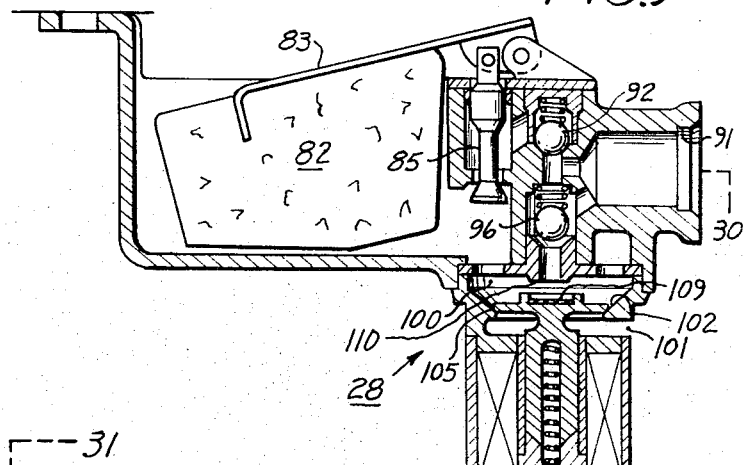

A drainage chamber 100 adjacent to, and preferably in, the bottom of cup 80 provides for draining the contents of the cup into a drainage port 101. At the bottom of the drainage chamber there is a valve seat 102. The plunger 103 of a solenoid 104 passes through valve seat 102 and carries a first valve seal 105. This valve seal is adapted to bear against the close valve seat 102 so as to close the drainage chamber 100 when the solenoid is energized to pull the plunger down to the position which is shown in FIG. 9.

FIG. 6 illustrates the condition wherein the valve seat 102 is open by virtue of the fact that the solenoid is de-energized, and the plunger is moved upwardly by a bias spring 106. The solenoid is provided with an electrical winding 107 for its actuation, which winding has appropriate leads 108 for connection to a source of electrical potential for energizing the solenoid.

Plunger 103 also carries a second valve seal 109 which faces upwardly so as to abut against a seat 110 at the lower end of the second check valve 96 to close the second check valve at its flow side opposite the pilot inlet when the solenoid is not energized. Plunger 103 also constitutes a check valve. It can be opened by actuating the solenoid, but otherwise remains closed because of the action of check valve 96 and of bias spring 106.

The operation of this valving system will now be described. There are six basic system conditions, and each will be separately discussed.

CONDITION 1 — REFUELING OF TANK 24 WHILE TANK IS EMPTY OR PARTLY FULL, AND VENTED BY VALVE 35

Figure 8:
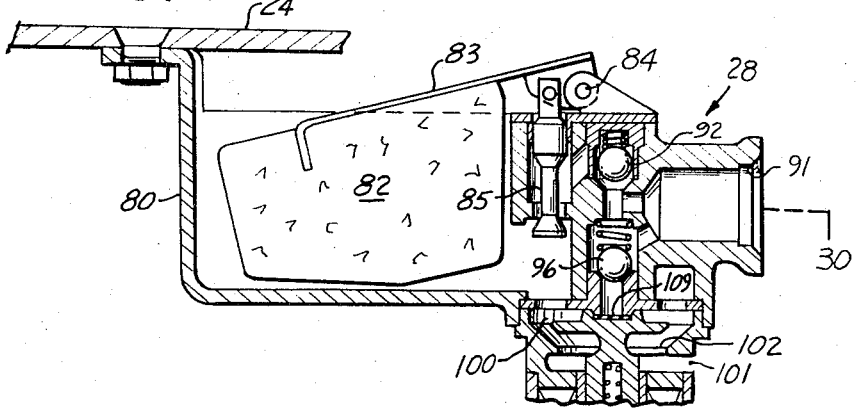
FIGS. 8 and 9 are fragmentary cross-sections of FIG. 6 showing the pilot valve in two different operational positions.
Figure 10:
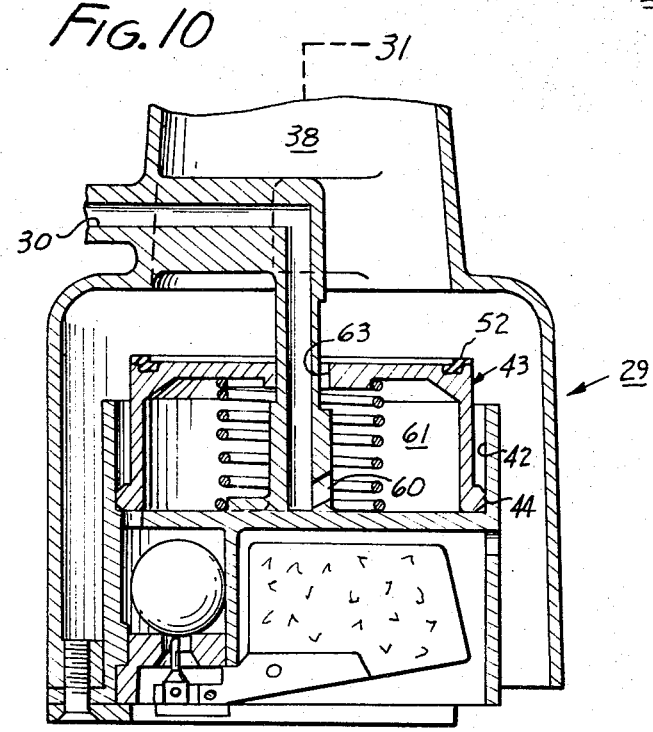
FIG. 10 is a partial view of FIG. 2 showing the flow valve in another of its operational positions.

This condition involves the valve settings of FIG. 10 — flow valve 29 open, and FIG. 8 — pilot valve with low float. Fuel for refueling under supply pressure is supplied at filler port 25 and thence through fuel conduit 31 to passage 38 where it exerts its pressure on the upper face of the piston.

In the pilot valve, the solenoid is de-energized, and any contents which may have been in the cup have drained out past seat 102. Float 82 is therefore down, and poppet valve 85 is open. Pressure in chamber 61 drains through conduit 30. The clearance at opening 63 is restrictive (a restrictive bleed passage), so a substantial differential pressure is developed across the piston faces that causes the piston to move downwardly away from valve seat 53, and the flow valve is opened. There is continued flow through the open pilot valve. First check valve 92 is opened by the positive differential to permit flow through the poppet valve and into the cup. The second check valve 96 is closed, and seal 102 remains open so the cup does not fill up.

CONDITION 2 — REFUELING OF TANK 24— SHUTOFF OF FLOW VALVE 29 WHEN TANK 24 IS FULL, AND VENTED BY VALVE 35

This condition results from the combination of the valve settings of FIG. 2 — flow valve closed, and FIG. 6 — pilot valve flooded with the poppet valve closed. After enough fuel is charged into the tank, its level will reach an elevation such as to flood cup 80 to level 81. This raises float 82 far enough to close poppet valve 85. Now there is no vent for chamber 61 through pilot conduit 30, so pressure builds up in chamber 61 to that of the fuel supply, whereupon the differential pressure vanishes which was holding the valve open for refueling. Then bias spring 55 closes the valve by forcing seal 51 against valve 53, the system is closed against fuel supply pressure, and fueling ceases.

CONDITION 3 — REFUELING OF TANK 24 — CHECKOUT OF SYSTEM SHUTOFF FUNCTION. TANK VENTED BY VALVE 35

In this condition, the full tank arrangement is simulated, so as to check out the shutoff operation of the system. This condition is illustrated by FIG. 2 — flow valve closed, and by a modification of FIG. 6 — pilot valve cup filled, which filling occurred as a consequence of closing seat 102 so as to trap fuel in the cup. This is done by actuating the solenoid.

The setting will have been that of refueling (Condition 1, above), but when checkout is desired, the solenoid is energized, and valve seal 105 will close on seat 102, threby closing the drainage chamber. Now, instead of permitting drainage from the cup until the cup is flooded as in a fulltank condition, the fuel which flows into the cup from the poppet valve during refueling is retained in the cup. The cup soon fills, and the float raises to close the poppet valve, thus simulating Condition 2, and fueling will stop. The system's functioning is thereby checked out.

CONDITION 4 — FUEL TRANSFER FROM TANK 24 TO TANK 23 WITH TANK 24 FULL OR PARTIALLY FULL. TANK PRESSURIZED BY VALVE 35

The foregoing conditions 1, 2 and 3 have all related to receiving fuel under positive pressure into a tank at lower pressure. Transfer of fuel involves precisely the opposite conditions. Transfer occurs when the tank is pressurized, and the fuel conduit is at a lesser pressure. Accordingly, one's orientation as to the valves must now be reversed.

When fuel transfer is desired, gas pressure; for example, compressed air bled from the jet engine compressor stage, is applied to tank 24 by opening valve 35, to apply pressure to the external tank, and closing the vent. A function equivalent can be arranged by applying suction at the filler port. The resulting configuration is a combination of FIG. 10 — flow valve open, and FIG. 6 (when the tank is initially full) or FIG. 6 modified to show a low float (when the tank is partially full) as in FIG. 8.

In this condition, the pilot valve is exposed to the high gas pressure. The pilot valve closes to prevent the passage of this pressure from the pilot valve to chamber 61 of the flow valve. First check valve 92 is closed by this differential, and so is the solenoid valve at valve seal 109. The float position is immaterial. Accordingly, chamber 61 is sealed off from the transfer pressure exerted in the tank.

As to the flow valve, the pressure in the lower end of passage 38 is higher than what will now be downstream pressure above valve seat 53. The chamber 61 is vented downstream (i.e., upwardly in FIG. 2) by clearance 64 and opening 63. The annular differential piston area outside the seal which is exposed to the higher pressure in the tank will, therefore, provide a net downward force on the piston which will open the flow valve. The valve will remain open at some equilibrium position, and transfer will continue, fuel flowing upwardly through passage 38 to the body tanks 23. The ball seal remains closed (except when the fuel is low or under negative g-forces), the weight of the ball being sufficient to overcome fluid force in the tank tending to lift it off of seat 69.

CONDITION 5 — FUEL TRANSFER FROM TANK 24 TO TANK 23 — STOP TRANSFER AT ARBITRARY TIME

With the external tank 24 still pressurized, it may be desired to stop the transfer. This condition is a combination of FIG. 2 — flow valve closed, and FIG. 9 — pilot valve solenoid energized.

The object of this setting is to equalize the pressure across the piston in the flow valve so it closes the flow valve. To accomplish this, solenoid 104 is energized, and the plunger moves to separate seal 109 from seat 110. Now transfer gas pressure can unseat second check valve 96, and gas pressure flows through pilot conduit 30 to chamber 61 of the flow valve. This removes the differential pressure which kept the flow valve open, and the flow valve closes. There is a small, continuous air bleed through clearance 64 in this condition.

CONDITION 6 — FUEL TRANSFER FROM TANK 24 TO TANK 23 — STOP TRANSFER WHEN TANK 24 EMPTY, OR UNDER NEGATIVE G-FORCES

When the tank is empty, or when the aircraft is in such attitude or condition as to cause gas rather than liquid to enter passage 38, fuel transfer should stop. This condition is a combination of the valve seatings of FIG. 2, with the auxiliary cutoff valve 65 position changed, and FIG. 6 with a low float. In fact, the condition of the pilot valve is immaterial, because the objective is to supply transfer gas pressure to chamber 61 under the two circumstances being discussed. This occurs in auxiliary cutoff valve 65, either when the fuel level is so low that float 66 drops so as to raise pin 68 and unseat ball seal 70, or when the ball seal falls away from seat 69 by virtue of its weight under negative $g$ condition. In either case, gas or liquid under transfer pressure passes through port 71 and into chamber 61 to close the valve. This condition stops the transfer function until the ball seal again rests on seat 69.

The system as described provides all necessary refueling, checkout and fuel transfer functions with only two very simple and rugged valves. The flow valve is basically a differential area piston valve, and the pilot valve is a simple float and solenoid device. However, their simplicity lies only in their construction. Their combination results in a sophisticated functional capacity.

This invention is not to be limited by the embodiments shown in the drawings and described in the description, which are given by way of example and not of limitation, but only in accordance with the scope of the appended claims.

We claim:

1. A flow control system for fueling a fuel tank and for transferring fuel from said tank to another, said system comprising: a pilot valve and a flow valve respectively adapted to be disposed at an upper and a lower level in said tank; a fuel conduit connected to the flow valve to supply fuel to the flow valve during fueling and to receive it from the flow valve during transfer; and a pilot conduit interconnecting the pilot valve and the flow valve, said flow valve comprising: a body having a first passage; a valve seat in said first passage; a cylinder having a wall with a central axis, said axis extending toward said seat; a piston making a sliding fluid sealing fit in said cylinder; a seal on said piston adapted to close on said seat, said piston being movable in one direction to cause said seal to close said seat, and in the opposite direction to open the same, said piston having a cross-section area greater than that bounded by the seal, whereby the piston is a differential area piston; and a restricted bleed passage interconnecting the opposite faces of the piston, one end of said first passage being connected to the fuel conduit, and the other end to the inside of said tank; said pilot valve comprising: a body having an open-topped cup with a drainage chamber adjacent to the bottom of the cup; a pilot inlet; a first check valve in fluid communication with said pilot in 135, and biased so as to be opened by a sufficient positive differential pressure in said pilot inlet; a second check valve biased to be closed by said positive differential pressure; a buoyant float in said cup; a poppet valve actuated by said float, said poppet valve receiving fuel from said first check valve, and being closed when the cup is full and open when it is not, so as to discharge fuel into said cup; a solenoid including a plunger; a first valve seal carried on said plunger adapted to close a valve seat through which fuel drains from the drainage chamber when the solenoid is energized, the plunger also carrying a second valve seal to close the second check valve at its flow side opposite the pilot inlet when the solenoid is not energized and to open the same when it is energized, the pilot conduit interconnecting the cylinder of the flow valve and the pilot inlet of the pilot valve; and means for applying gas under pressure to said tank when fuel transfer is to occur.

2. A flow control system according to claim 1 in which an axuiliary cutoff valve is provided which is sensitive to an empty tank and to negative *g* forces, comprising: a float adapted to be disposed at a level in the tank indicative of the lowest desired fuel level; a passage from the fuel tank to the cylinder; a valve seat in said last-named passage; a ball seal adapted to rest upon and close said last-named valve seat in the absence of forces to remove it; and a pin passing through said last-named valve seat pinned to the float, whereby when the fuel is low in the tank, the float moves the pin to upset the ball seal from the last-named valve seat and admit tank pressure to the cylinder.

3. A flow control system according to claim 1 in which a post passes through the piston across its faces, the pilot conduit passing through said post and entering into the cylinder therethrough.

4. A flow control system according to claim 3 in which an auxiliary cutoff valve is provided which is sensitive to an empty tank and to negative g forces, comprising: a float adapted to be disposed at a level in the tank indicative of the lowest desired fuel level; a passage from the fuel tank to the cylinder; a valve seat in said last-named passage; a ball seal adapted to rest upon and close said last-named valve seat in the absence of forces to remove it; and a pin passing through said last-named valve seat pinned to the float, whereby when the fuel is low in the tank, the float moves the pin to upset the ball seal from the last-named valve seat and admit tank pressure to the cylinder.

5. A flow control system according to claim 1 in which the valve seal which closes the second check valve, and the valve seal which closes the drainage chamber, are both mounted to the plunger of the solenoid, whereby these valve seals alternatively close or open their respective valves as a function of solenoid actuation or de-actuation.

6. A flow control system according to claim 1 in which the first passage in the flow valve enlarges at the its respective seat and in which the larger portion shrouds the cylinder.

7. A flow control system according to claim 6 in which an auxiliary cutoff valve is provided which is sensitive to an empty tank and to negative g forces, comprising: a float adapted to be disposed at a level in the tank indicative of the lowest desired fuel level; a passage from the fuel tank to the cylinder; a valve seat in said last-named passage; a ball seal adapted to rest upon and close said last-named valve seat in the absence of forces to remove it; and a pin passing through said last-named valve seat pinned to the float, whereby when the fuel is low in the tank, the float moves the pin to upset the ball seal from the last-named valve seat and admit tank pressure to the cylinder, the auxiliary cutoff valve being disposed adjacent the bottom of the enlarged portion of the passage in the flow valve.

8. A flow valve for flow control system for fueling fuel tank and for transferring fuel from said tank to another, said flow valve comprising: a body having a passage; a valve seat in said passage; a cylinder having a wall with a central axis, said axis extending toward said seat; a piston making a sliding fluid sealing fit in said cylinder; a seal on said piston adapted to close on said seat, said piston being movable in one direction to cause said seat to close said seal, and in the opposite direction to open the same, said piston having a cross-section area greater than that bounded by the seal, whereby the piston is a differential area piston; and a restricted bleed passage interconnecting the opposite faces of the piston, one end of said passage being adapted to be connected to a fuel conduit, and the other end to the inside of a tank; and an auxiliary cutoff valve mounted to said body which is sensitive to an empty tank and to negative *g* forces, comprising: a float adapted to be disposed at a level in the tank indicative of the lowest desired fuel level; a passage from the fuel tank to the cylinder; a valve seat in said passage; a ball seal adapted to rest upon and close said valve seat in the absence of forces to remove it; and a pin passing through said valve seat pinned to the float, whereby when the fuel is low in the tank, the float moves the pin to upset the ball seal from the seat and admit tank pressure to the cylinder.

9. A pilot valve for a flow control system for fueling a fuel tank and for transferring fuel from said tank to another, said pilot valve comprising: a body having an open-topped cup with a drainage chamber adjacent to the bottom of the cup; a pilot inlet; a first check valve in fluid communication with said pilot inlet, and biased so as to be opened by a sufficient positive differential pressure in said pilot inlet; a second check valve biased to be closed by said positive differential pressure; a buoyant float in said cup; a poppet valve actuated by said float, said poppet valve receiving fuel from said first check valve, and being closed when the cup is full and open when it is not, so as to discharge fuel into said cup; a solenoid including a plunger; a first valve seal carried on said plunger adapted to close a valve seat through which fuel drains from the drainage chamber when the solenoid is energized, the plunger also carrying a second valve seal to close the second check valve at its flow side opposite the pilot inlet when the solenoid is not energized and to open the same when it is energized; a pilot conduit interconnecting the cylinder of the flow valve and *a* pilot inlet of the pilot valve; and means for applying gas under pressure to said tank when fuel transfer is to occur.

10. A pilot valve according to claim 9 in which the valve seal which closes the second check valve, and the valve seal which closes the drainage chamber, are both mounted to the plunger of the solenoid, whereby these valve seals alternatively close or open their respective valves as a function of solenoid actuation or de-actuation.

* * * * *